United States Patent [19]

Spencer

[11] 4,096,432
[45] Jun. 20, 1978

[54] METAL DETECTORS FOR DISCRIMINATORY DETECTION OF BURIED METAL OBJECTS

[75] Inventor: Paul Anthony Spencer, London, England

[73] Assignee: Arado Electronics, London, England

[21] Appl. No.: 746,586

[22] Filed: Dec. 1, 1976

[30] Foreign Application Priority Data

Jul. 14, 1976 United Kingdom ............... 29379/76

[51] Int. Cl.$^2$ ............................................. G01V 3/10
[52] U.S. Cl. ..................................... 324/3; 324/233; 324/239
[58] Field of Search ................................. 324/3, 41, 6

[56] References Cited

U.S. PATENT DOCUMENTS

| 3,676,772 | 7/1972 | Lee | 324/41 |
| 3,826,973 | 7/1974 | Pflaum | 324/3 |
| 3,872,380 | 3/1975 | Gardiner | 324/3 X |

OTHER PUBLICATIONS

Le Gaye, E. S., Induction Balance Detector, Electronic Metal Detector Handbook, Western Heritage Press, Mar. 1975, pp. 95, 96.

*Primary Examiner*—Gerard R. Strecker
*Attorney, Agent, or Firm*—Robert F. O'Connell

[57] ABSTRACT

A metal detector has a balanced coil arrangement fed by an audio frequency oscillator. In-phase and quadrature components arising when the arrangement is unbalanced by proximate conductive objects are detected, the sense of the quadrature component depending on whether the object is ferromagnetic or non-ferromagnetic. The quadrature component varies the frequency of another audio frequency oscillator above and below a mean value and the in-phase component controls the strength of the audio frequency signal fed from the second oscillator to a transducer such as headphones.

11 Claims, 2 Drawing Figures

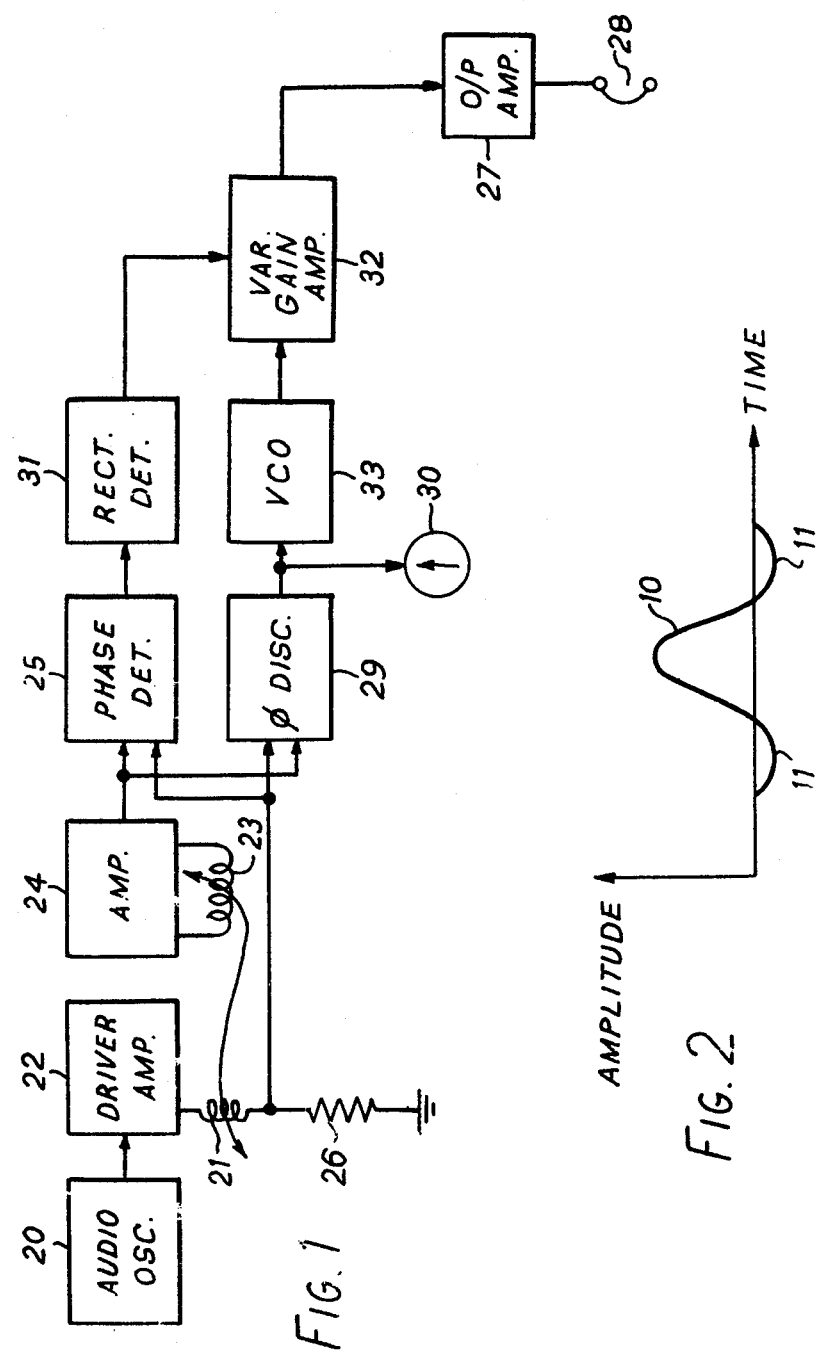

METAL DETECTORS FOR DISCRIMINATORY DETECTION OF BURIED METAL OBJECTS

The present invention relates to metal detectors such as are used to detect buried coins and other metal objects of value. The invention is an improvement on the invention forming the subject matter of my U.S. application Ser. No. 654,039, filed 2nd Feb. 1976, which generally relates to a metal detector comprising a coil arrangement with an energizing audio frequency oscillator. The coil arrangement is balanced to null out a signal. Proximate conductive objects which absorb energy upset the balance and influence the sense of the quadrature component in dependence upon whether the objects are non-ferromagnetic or ferromagnetic. Means are provided for separately detecting in phase and quadrature components of the said signal to detect such objects.

The detector described in the Specification of the aforesaid application utilizes a transducer (e.g. headphones) responsive to the detected in-phase component to provide an audible tone and a meter responsive to the detected quadrature-phase component to indicate the sense thereof. The audible tone enables metal objects to be detected and the meter indicates whether they are ferromagnetic or non-ferromagnetic. It has been found that such an arrangement, while enabling a very satisfactory degree of discrimination to be made between the various types of metal object detected, suffers from some practical problems in use. In particular, the user has continually to refer to the meter as he is walking over terrain in order to determine whether a change in the audible tone is being caused by an object of likely value or not and this is somewhat inconvenient. Also, it is somewhat difficult to localize the object precisely for reasons which are explained below.

With a view to overcoming these objections, there is now provided an improvement which enables all information to be given audibly. According to this improvement, there is further provided a variable frequency audio oscillator responsive to the quadrature component to vary the frequency thereof above and below a base frequency in dependence upon the sense of the quadrature component, a transducer for providing an audible tone from the output of the oscillator, and means responsive to the in-phase component to vary the amplitude of the signal applied to the transducer.

Preferably, the in-phase component is rectified and smoothed to provide a control signal, with a smoothing time constant which is long compared with the period of the energizing oscillator but short enough to allow the control signal to vary at the sort of rate required to detect objects when a person is walking the detector over terrain. In practice, this means a time constant less than 100 ms and preferably in the range 1 to 10 ms. This control signal can then be used to vary the amplitude of the signal applied to the transducer, e.g., by controlling a variable gain amplifier. This signal can be completely blocked until the control signal reaches a threshold value indicative of the presence of a body of sufficient conductive mass to be of likely interest, but the more usual practice will be to operate on the threshold so that any metallic object will cause an output signal of some kind to be applied to the transducer. Above the threshold, the amplitude of the signal applied to the transducer increases the more highly conductive the detected body.

The invention will be described in more detail, by way of example, with reference to the accompanying drawings, in which:

FIG. 1 is a block circuit diagram of an embodiment of the invention; and

FIG. 2 shows an explanatory waveform.

FIG. 1 shows a circuit of which the part first to be described is the same as in the aforementioned application.

An audio oscillator 20 provides a pure sinusoidal signal at a suitable frequency below 10 kHz, such as 1.5 kHz or 2.5 kHz, and drives a transmitting coil assembly 21 via a driver amplifier 22. A separate receiving coil assembly 23 is employed and is coupled to a high gain amplifier 24. The apparatus can be constructed in conventional manner with the coils in a paddle on the lower end of a rod with a handle at the top which allows the user to move the coil over the surface of the ground. Both coils are flat, horizontal coils and are partially overlapped as indicated by the arrow showing mutual inductance. By finely adjusting the degree of overlap, the response of the device when the coils are not near any conductive body can be nulled to zero. Other known techniques can be used to achieve the same result, e.g., inductance bridge balancing technique, and it is also possible to use a single coil as the transmitting and receiving or sensing coil. Preferably, a factory adjustment is made by adjusting the degree of overlap and fine adjustments are, thereafter, made electrically.

The signal from the amplifier 24 is applied to a phase-sensitive sampling type of detector 25 which receives a reference signal conveniently picked off a resistor 26 in series with the coil 21. Assuming that the circuit has been nulled to zero as described, there is no in-phase component in the received signal when energy absorption is not taking place but an in-phase component appears when energy is absorbed by a conductive body. In the aforementioned application, the resulting signal is amplified and applied to an indicator which may be headphones. As the device is swept across a solid metal object, the user hears a burst of high-pitched tone. A convenient form for the detector 25 is a sampling detector in which the reference signal is full-wave rectified and sampling pulses are derived at the nulls of the rectified signal and used to sample the signal from the amplifier 24.

FIG. 2 shows the form of the envelope of a typical signal from a small shallow object at the output of the detector 25. A central peak 10 is flanked by two smaller peaks 11 which are 180° out-of-phase with the central peak signal. This phase reversal is of no aural significance and what the user hears is rather spread out peak which makes localization of small objects close to the search coil difficult.

In the circuit of FIG. 1, the signal from the detector 25 no longer drives a transducer. It is applied to a rectifying and smoothing circuit 31 which develops a control voltage from only the peak 27 (because of the rectification) and smooths this with a time constant of 1 to 10 ms. The smoothed control voltage controls a variable gain amplifier 32 which is cut off until the control voltage reaches a suitable threshold level. The amplifier 32 controls the amplitude of a signal reaching a transducer such as headphones 28, via an output amplifier 27, from an audio frequency oscillator 33 which has a base frequency of say, 500 Hz. The amplitude of the signal heard in the headphones is thus an indication of the conductive mass of a detected body.

The burst of tone heard by the user may denote a ferrous or non-ferrous conductive body. To enable discrimination between these, the reference signal and signal from amplifier 24 are also applied to a conventional phase discriminator 29 to determine the amplitude of the quadrature component of the received signal. The output from the discriminator 29 is a second control voltage which is used to control the frequency of the oscillator 33, this being a voltage controlled oscillator (VCO). The frequency of the VCO is varied above and below the base frequency in dependence upon the sign and magnitude of the second control voltage. Assuming that non-ferromagnetic bodies cause the frequency to rise and ferromagnetic bodies cause the frequency to fall (although the converse can readily to arranged), a pure silver body will give a high frequency, a copper, gold or silver alloy will give a fairly high frequency (above 500 Hz), a piece of aluminium foil will give little or no frequency change, whereas a ferrous body will give a low frequency (below 500 Hz). The user is thus able to interpret results solely on the basis of what he hears in the headphones each time he passes over a conductive tone of which the strength and frequency will give him a very good idea as to its potential worth.

In order to enable the user to check on his aural interpretation, the output of the phase discriminator may optionally also be applied to an indicator which may be a centre-zero meter 30. The sense in which the needle of the meter deflects indicates whether the body detected in the headphones 28 is ferrous or non-ferrous. A ferromagnetic conductor will increase inductance and lead to a lagging quadrature component. A non-ferromagnetic conductor will reduce inductance and create a leading quadrature component. This use of the centre-zero meter is disclosed in the aforementioned application.

I claim:

1. A metal detector comprising a coil arrangement having input and output terminals, an energizing audio frequency oscillator connected to the input terminals, the coil arrangement being balanced to provide a null signal at the output terminals in the absence of proximate conductive objects, means connected to the output terminals for separately detecting in-phase and quadrature components of the said signal created by proximate conductive objects which absorb energy and which influence the sense of the quadrature component in dependence upon whether the objects are non-ferromagnetic or ferromagnetic, a continuously variable frequency audio oscillator having a frequency control terminal responsive to the quadrature component to vary the frequency of the oscillator above and below a base frequency in dependence upon the sense of the quadrature component, a transducer for providing an audible tone from the output of the oscillator, and means responsive to the in-phase component to vary continuously the amplitude of the signal applied to the transducer in dependence on the strength of the in-phase component.

2. A metal detector according to claim 1, comprising means for rectifying and smoothing the in-phase component to provide a control signal which varies the amplitude of the signal applied to the transducer.

3. A metal detector according to claim 2, wherein the smoothing time constant is less than 100 ms.

4. A metal detector according to claim 3, wherein the smoothing time constant is in the range 1 to 10 ms.

5. A metal detector according to claim 2, wherein the control signal controls the gain of a variable gain amplifier between the variable frequency audio oscillator and the transducer.

6. A metal detector according to claim 2, wherein the signal applied to the transducer is completely blocked until the control signal reaches a predetermined threshold level.

7. A metal detector according to claim 1, wherein the variable frequency oscillator is a voltage controlled oscillator controlled in frequency by a voltage representing the quadrature component.

8. A metal detector according to claim 1, wherein the energizing oscillator frequency is below 10 kHz.

9. A metal detector according to claim 1, wherein the coil arrangement comprises a transmitting coil connected to the energizing oscillator and a receiving coil connected to the detecting means.

10. A metal detector according to claim 9, wherein the coil arrangement is substantially balanced by overlap of the coils.

11. A metal detector according to claim 1, wherein the in-phase detector is a sampling detector.

* * * * *